Aug. 26, 1947.  W. A. HOWREN, JR  2,426,554
ADJUSTING DEVICE FOR TURN AND BANK INDICATORS
Filed Oct. 16, 1944  2 Sheets-Sheet 1

Inventor
Walker A. Howren, Jr.
By Clarence A. O'Brien
and Harvey B. Jackson
Attorneys

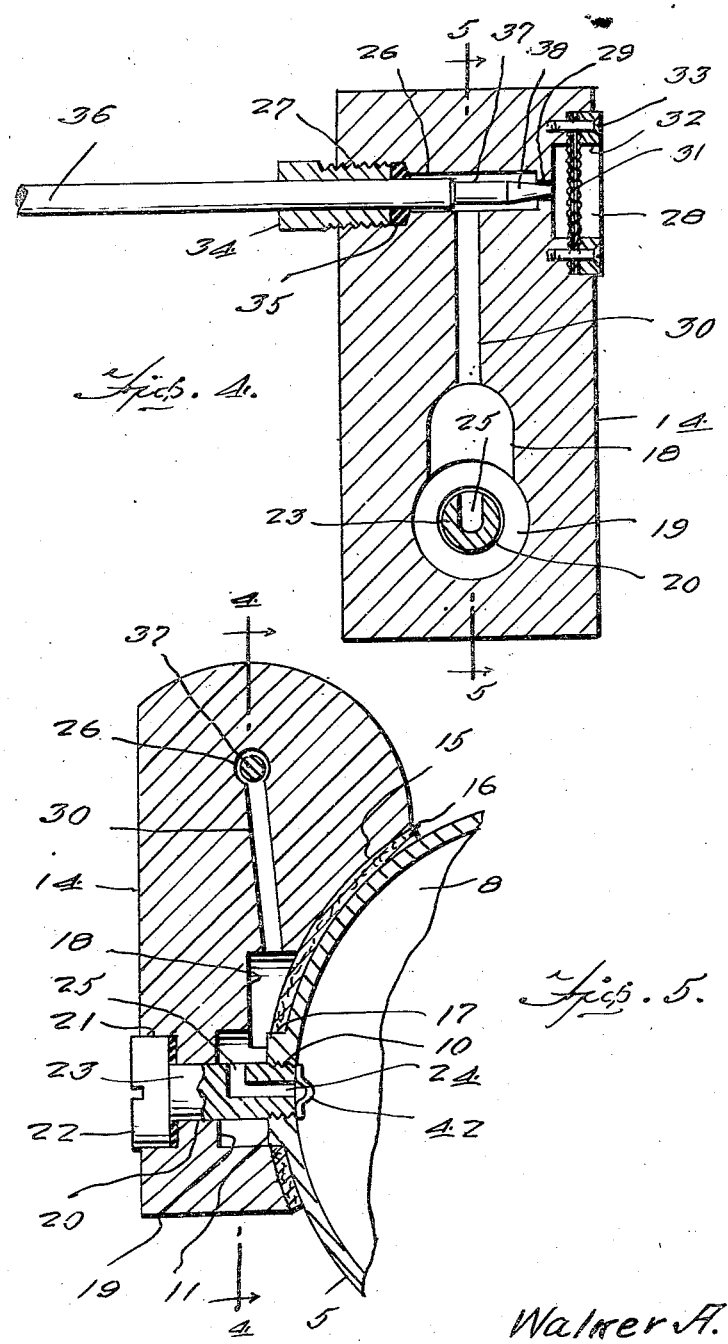

Patented Aug. 26, 1947

2,426,554

UNITED STATES PATENT OFFICE 2,426,554

ADJUSTING DEVICE FOR TURN AND BANK INDICATORS

Walker A. Howren, Jr., Norfolk, Va.

Application October 16, 1944, Serial No. 558,933

4 Claims. (Cl. 74—5)

1

This invention relates to an adjusting device for turn and bank indicators, of the type commonly used on airplanes and shown in the U. S. Patent to R. C. Sylvander, No. 2,189,375 dated February 6, 1940.

More particularly, the present invention relates to an adjusting device for use in setting a turn and bank indicator for accurate operation by adjusting the partial vacuum which exists in the rotor case of the indicator, thereby controlling the speed of the rotor which drives the gyroscope of the indicator.

As shown in the above mentioned patent, a conventional turn and bank indicator includes a turn-indicating unit embodying a gyroscope which is driven by air pressure exerted against a rotor, the gyroscope having one degree of freedom. When the rotating gyroscope assembly is turned in any plane other than its plane of rotation, the gyroscope precesses. This precession is restrained by an adjustable calibrated spring, is damped by a cylinder and damping piston, and is transmitted to the pointer by a linkage assembly. The pointer, in turn, indicates the rate at which the turn is being made. A turn and bank indicator is operated at the present time under normal flight conditions with a partial vacuum of 1.80 to 2.05 inches Hg. As a rule, when the instrument is installed and the vacuum is set for flight, a standard amount of 1.90 Hg is provided by various means of adjustable restrictions in the line running from the main source of vacuum to the instrument. There are times when this setting is correct on the first flight, but in the majority of instances, one or two more additional adjustments must be made with additional flights for each adjustment. This is due to the varying temperatures and the individual instrument characteristics. Heretofore, when a turn and bank indicator has been checked in a test flight and an error has been found in its indication, it has been necessary that the plane return to the field and that the correction be made by an instrument technician. For instance, if the airplane is flown in a 360-degree turn, the turn being made according to the turn and bank indicator's indication for that degree of turn, the complete turn should be made in two minutes. However, if the pilot finds, by checking with his directional gyroscope and timing with his stop watch, that the turn was completed in 1 minute and 50 seconds, or sooner, he knows that the turn and bank indicator is giving an incorrect indication. This check is made on both left and right turns, and the indication, if off on the right,

2 should be off the same amount on the left. According to the above-mentioned check, the indicator is 10 seconds off on both left and right turns, and the instrument must be corrected for this error. An error of this kind is corrected by increasing the amount of vacuum provided in the indicator case. This is done by means of whatever type of controllable or adjustable restriction is being used in the line from the source of vacuum to the instrument or indicator, the error being caused by the rotor turning at a lesser speed than required. By increasing the amount of vacuum, greater air pressure is drawn through the jet and exerted against the rotor, which in turn causes increased speed. If, in flight, the turns had been made in 2 minutes and 10 seconds instead of 1 minute and 50 seconds, as described above, the error would be corrected by decreasing the amount of vacuum so as to reduce the speed of the rotor to the correct amount. As stated above, at present these corrections can only be made on the ground.

An important object of the present invention, therefore, is to provide a device which makes it possible for the pilot of any airplane to control or regulate, while in flight, the performance of a turn and bank indicator.

A more specific object of the present invention is to provide an adjusting device of the above kind which is comparatively simple and compact in construction, easy to install and use, and highly efficient in operation.

Other objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views;

Figure 4 is an enlarged vertical sectional view of the adjusting device taken substantially on the plane of line 4—4 of Figure 5, and Figure 5 is a vertical section taken substantially on the plane of line 5—5 of Figure 4.

Figure 1:
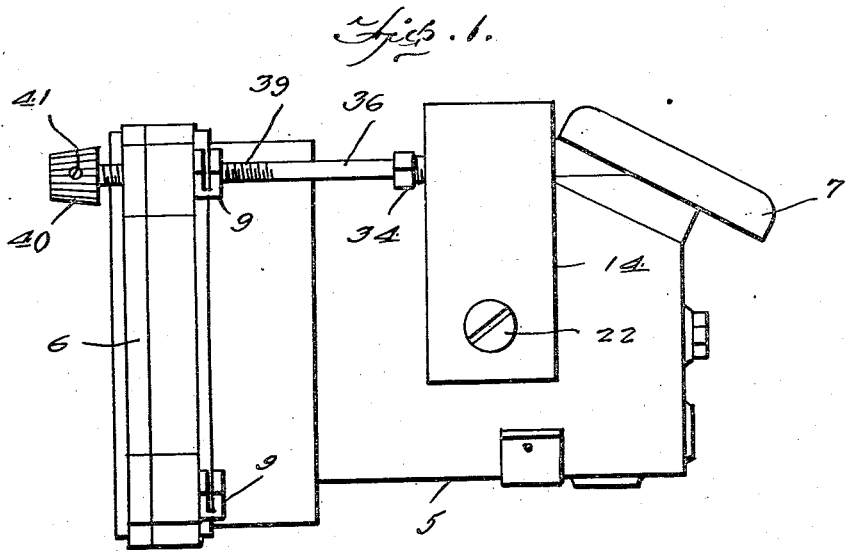
Figure 1 is a side elevational view of a turn and bank indicator equipped with an adjusting device constructed in accordance with the present invention.
Figures 2, 3:
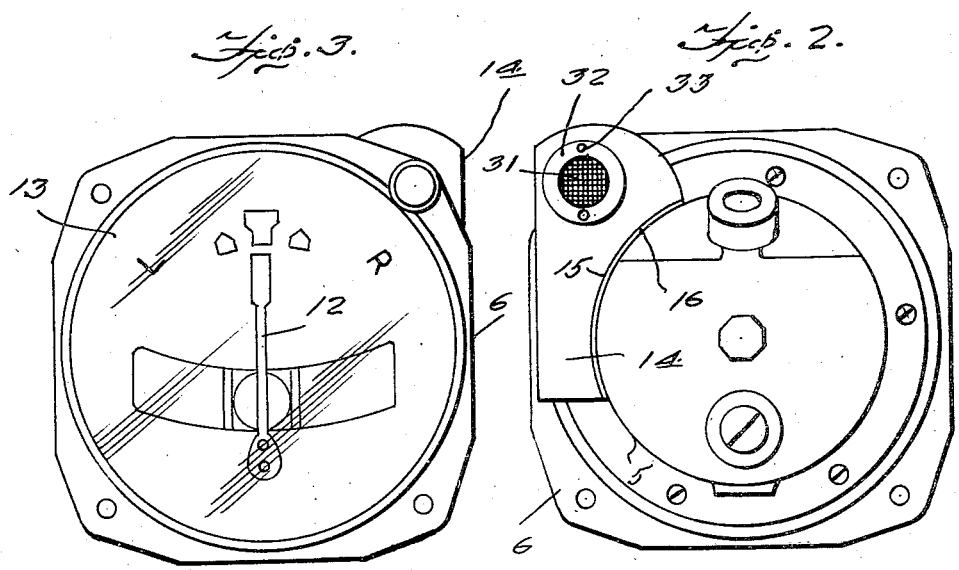
Figure 2 is a rear elevational view thereof, with the main filter of the indicator removed.
Figure 3 is a front elevational view thereof.

Referring in detail to the drawings, 5 indicates the casing of a conventional turn and bank indicator which has an indicating unit 6 at the front and a main filter 7 at the rear. The casing 5 has a chamber 8 which accommodates the gyroscope and its driving rotor. The unit 6 has the usual corner ears for reception of bolts to secure the indicator to an instrument panel, and the usual stop or lock nut 9 is provided at the back of each ear. At one side, the casing 5 is provided with a threaded opening 10 that ordinarily accommodates a threaded plug and through which a lubricant may be introduced, when necessary, upon removal of the plug. This opening 10 is surrounded by an external boss 11. The indicator unit includes an indicating hand 12 movable across a face or dial and disposed behind a transparent closure plate or disc 13.

The present adjusting device includes a vertically elongated block 14 provided at the lower portion of its inner side with a concave recess 15 conforming to the contour of the casing 5 of the indicator so as to fit against the side of said casing 5 where the oil hole 10 is provided. Interposed between the surface of the recess 15 and the adjacent surface portion of the casing 5 is a gasket 16 that has an opening at 17 to snugly fit over the boss 11. The gasket 16 affords an air-tight union between the block 14 and the casing 5 when said block is drawn tightly against the casing 5 as and by a means to be presently described. The lower portion of the block 14 has further communicating upper and lower recesses 18 and 19 that open into the recess 15, the recess 19 being located coaxial with the opening 10 and an opening 20 provided transversely of the block 14 from the outer side of the latter to the recess 19. The opening 20 is counterbored at its outer end, as at 21, to accommodate the head 22 of a securing bolt 23 that is passed through the opening 20 and the recess 19 and threaded into the oil hole 10 to tightly draw the block 14 in place against the side of casing 5. The inner end portion of bolt 22 has an axial passage 24 terminating at its outer end in a radial branch 25 that opens into the recess 19. In this assembly, the oil hole 10 is utilized so that drilling of a separate or additional opening in the casing 5 is not necessary.

Extending through the upper portion of the block 14 from front to rear thereof is a cylindrical bore 26 that is counterbored and threaded at its front end portion, as at 26, and communicates at its rear end with the central portion of a circular recess 28 provided in the rear portion of the block 14. A restricted port 29 affords communication between the rear end of bore 26 and recess 28 and is tapered to constitute a valve seat. A vertical bore 30 in the block 14 affords communication between the intermediate portion of bore 26 and the top of recess 18. An air filter is secured and countersunk in the recess 28 and includes a plurality of filtering discs at 31 and a securing ring 32 fastened in place by means of bolts 33 passed through the ring 32 and the margins of the discs at 31 and threaded into the block 14. In the front counterbored end portion of bore 26 is screwed a bushing 34 of a packing gland that also includes a packing 35 disposed in the bore portion 27 inwardly of the bushing 34. Slidable through the bushing 34 and packing 35 is a cylindrical valve rod 36 having a reduced portion 37 disposed in the bore 26 and a tapered rear end 38 arranged to cooperate with the seat 29. The gland 34, 35 prevents leakage of air inwardly to the bore 26 about the valve rod 36, and it will be apparent that the valve rod 36 may be seated upon rearward movement thereof so as to prevent admission of air through the filter into the casing 5 by way of bore 26, passage 30, recesses 18 and 19, and passages 25 and 24. On the other hand, by moving the valve rod 36 forwardly, it may be unseated to admit air into casing 5 after being filtered by the filter 31, 32. The degree of opening of valve rod 36 will, of course, govern the amount of air admitted to casing 5.

The valve rod 36 has a threaded forward end portion 39 which is passed through an ear of unit 6 and threaded through the stop nut 9 carried thereby, so that rotation of valve rod 36 will effect the desired longitudinal movement of the valve rod and seating or unseating thereof. A suitable knob 40 is threaded on the forward end of valve rod 36 in front of the unit 6, and a set screw 41 removably secures the knob on said valve rod so that the knob may be utilized for rotating the valve rod. While I have described a preferred manner of installing the device upon the indicator, it will be apparent that the device might be installed in other ways.

In using an adjusting device constructed in accordance with the present invention, the amount of vacuum in the casing 5 must first be set before flight. This is done by connecting a test gauge to an unused hole in the casing 5, closing the valve of the adjusting device, and setting the vacuum in the instrument by means of whatever type of controllable restriction is being used in the turn and bank system, with the airplane engine turning at cruising speed, the setting being at 2.04 inches Hg. The valve of the present device is then opened, at which time the test gauge is watched to determine how much the vacuum decreases in the casing 5. With that figure determined, the valve of the present device is closed slowly until the vacuum in the casing 5 has again risen to one-half of the total amount it had dropped. This has now adjusted the valve of the present device so that it is exactly one-half open and so that the vacuum in the casing 5 is approximately 2 inches Hg. If such is not the case, the restriction in the system is adjusted so that such will be the case. The test gauge is then removed and the hole in which it was placed is closed or plugged. The instrument is now ready for the test flight. If, during the flight, an error occurs, the correction can be made by the pilot immediately or while still in flight. The correction can be made by adjusting the valve of the device to regulate the vacuum in the instrument, the amount of adjustment of the valve being governed by the magnitude of the error, and the character of the error determining the direction in which the valve is adjusted. In other words, if the turn is made too quick, the error is corrected by increasing the amount of vacuum in the casing 5, and if the turn is made too slowly, the error can be corrected by decreasing the amount of vacuum in said casing. Obviously, by turning the valve rod in one direction, it is moved toward its seat so as to partially close the opening in the valve seat and thereby reduce a measured amount of air which is allowed to bleed into the casing 5, thereby increasing the vacuum. The reverse operation is had when it is desired to decrease the vacuum in the instrument. After the pilot has made the adjustment by turning the knob 40, he checks the turn and bank indicator again by making another turn and checking as before. In the event that there is still a slight error, he can make another slight adjustment and return to the field, having fully checked and regulated the instrument in one flight to the desired accuracy. A deflector plate 42 is preferably mounted on the inner end of the bolt 23 so as to cause the air to flow along the sides of the casing 5 and prevent the force of air from striking the side of the rotor and thereby causing a disturbance.

From the foregoing description, it is believed that the construction and operation, as well as the advantages, of the present invention will be readily understood and appreciated by those skilled in the art. Modifications and changes in details of construction illustrated and described may be made, such as fairly fall within the spirit and scope of the invention as claimed.

What I claim is:

1. A device for controlling the admission of air to the casing of a conventional rate-of-turn and bank indicator to vary the speed of the gyroscope rotor of the latter, comprising a valve block having a concave face to fit against a side of the indicator casing and provided with an air inlet bore, means to place said bore in communication with the interior of said casing including a bolt having an air passage, said bolt passing through the valve block and being adapted to be threaded through said casing to secure the valve block to the latter, and a valve rod operable for controlling the admission of outside air into said air inlet bore, said valve rod being adapted to be arranged beside and to project at the front of the indicator casing for convenient operation thereof when the device is applied to the indicator.

2. A device for controlling the admission of air to the casing of a conventional rate-of-turn and bank indicator to vary the speed of the gyroscope rotor of the latter, and wherein the casing has an ear near the front thereof and a nut on the back of said ear, comprising a valve block having a concaved face to fit against a side of the indicator casing and provided with an air inlet bore, means to place said bore in communication with the interior of said casing including a bolt having an air passage, said bolt passing through the valve block and being adapted to be threaded through said casing to secure the valve block to the latter, and a threaded valve rod axially movable to control the admission of outside air into said air inlet bore, said valve rod being adapted to be arranged beside and to project at the front of the indicator casing for convenient operation thereof when the device is applied to the indicator, said valve rod being adapted to extend through the ear of the casing and to have threaded engagement with the nut on said ear so that turning of said valve rod will cause axial movement thereof.

3. In combination with the casing of a conventional rate-of-turn and bank indicator, said casing having a rear gyroscope chamber and an opening in one side through which a lubricant may be introduced to bearings of the gyroscope rotor, said casing further having ears near the front and nuts on the backs of said ears for mounting the indicator on an instrument panel, a manually adjustable needle valve mounted on said side of the casing for bleeding air into said chamber through said opening in order to control the speed of the gyroscope rotor, said needle valve including an axially movable valve rod extending forwardly through and having threaded engagement in the nut of one of said ears, said valve rod further extending forwardly beyond the front of said casing and having an operating knob on the forward end thereof.

4. In combination with the casing of a conventional rate-of-turn and bank indicator, said casing having a rear gyroscope chamber and an opening in one side through which a lubricant may be introduced to bearings of the gyroscope rotor, said casing further having ears near the front and nuts on the backs of said ears for mounting the indicator on an instrument panel, a manually adjustable needle valve mounted on said side of the casing for bleeding air into said chamber through said opening in order to control the speed of the gyroscope rotor, said needle valve including a block having a concave lower side face to fit against said side of the indicator casing, a recess in said face arranged to communicate with said opening, a bore through and from front to rear of its upper portion communicating with said recess, and a second recess in the rear of its upper portion into which said bore opens, an air filter secured in said second recess, a bolt passing through said block and threaded into said opening to secure the block to said casing, said bolt having a passage to afford communication between the first-named recess and the interior of said casing, and an axially movable valve rod extended into said bore through the front of the block and adjustable to restrict the passage of air into said bore from said second recess, said valve rod having threaded engagement in the nut of one of said ears and extending forwardly beyond the front of the casing.

WALKER A. HOWREN, JR.

REFERENCES CITED

The following references are of record in the file of this patent:

UNITED STATES PATENTS

| Number | Name | Date |
| --- | --- | --- |
| 1,610,930 | Colvin | Dec. 14, 1926 |
| 1,955,488 | Crane et al. | Apr. 17, 1934 |
| 2,313,554 | Jones | Mar. 9, 1943 |
| 2,190,698 | Carter | Feb. 20, 1940 |
| 2,189,375 | Sylvander | Feb. 6, 1940 |
| 2,146,336 | Frey | Feb. 7, 1939 |